G. F. BULL & E. W. STARKEY.
WIRE CUTTER.
APPLICATION FILED JUNE 12, 1917.
1,266,398.
Patented May 14, 1918.
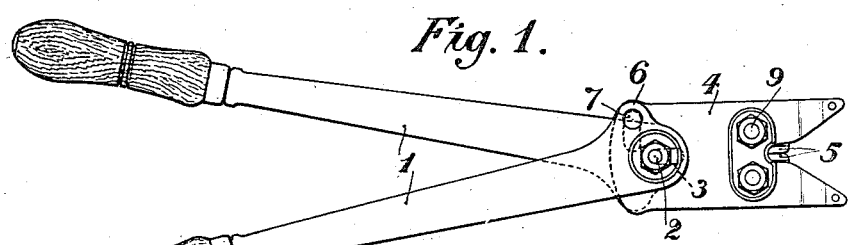
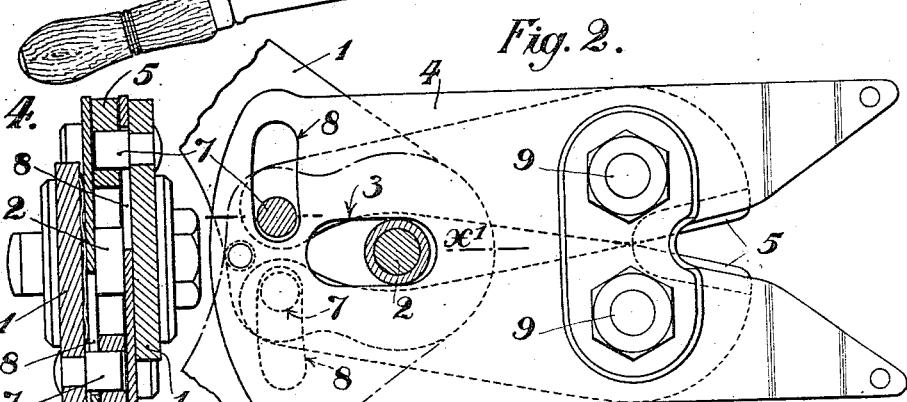
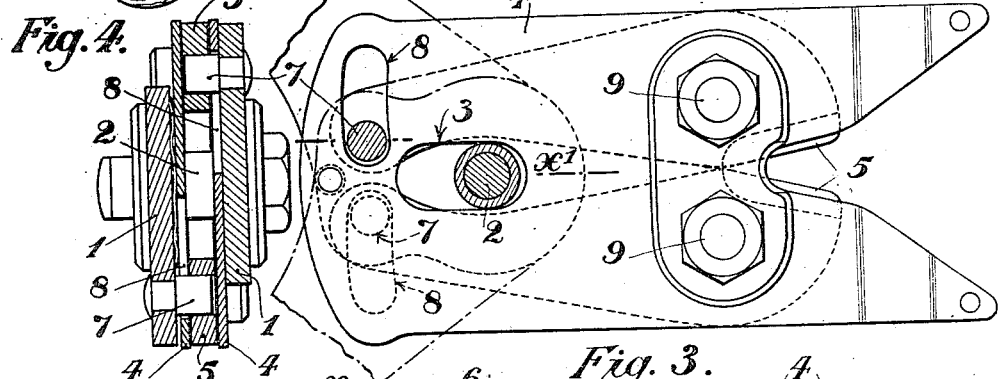
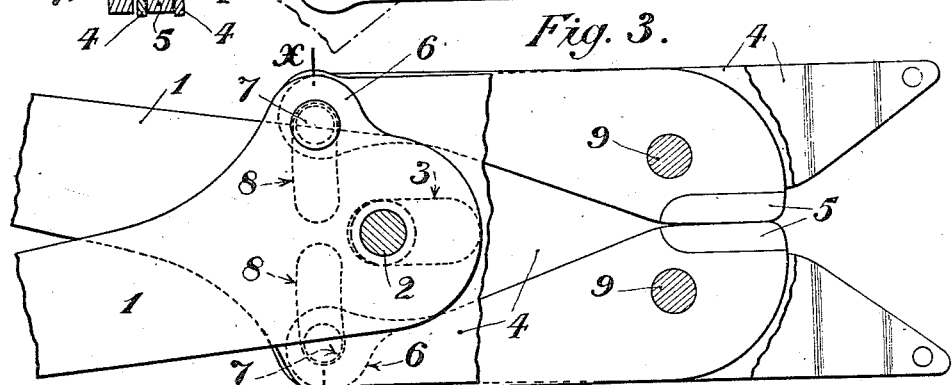
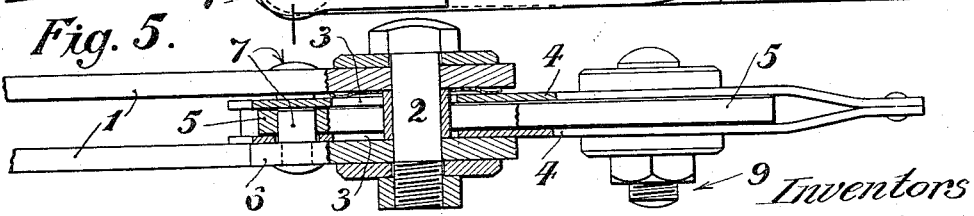
WITNESSES
M. E. McHale,
C. S. Kesler
Inventors
George F. Bull
Ernest W. Starkey
by James L. Norris
Attorney

UNITED STATES PATENT OFFICE.

GEORGE FREDERICK BULL AND ERNEST WALTER STARKEY, OF SMALL HEATH, BIRMINGHAM, ENGLAND; SAID STARKEY ASSIGNOR TO CHARLES H. PUGH, LIMITED, OF SMALL HEATH, BIRMINGHAM, ENGLAND.

WIRE-CUTTER.

1,266,398.          Specification of Letters Patent.          Patented May 14, 1918.

Application filed June 12, 1917.   Serial No. 174,351.

*To all whom it may concern:*

Be it known that we, GEORGE FREDERICK BULL and ERNEST WALTER STARKEY, subjects of the King of Great Britain, residing at Small Heath, Birmingham, England, have invented certain new and useful Improvements in Wire-Cutters, of which the following is a specification.

The present invention relates to wire cutters, but has more particular relation to implements for cutting very thick wire such as is used in wire entanglements and the like for military defensive purposes, the said cutters being of that type comprising two operating levers or handles pivoted upon a common center and connected to the tail ends of pivoted cutting jaws.

According to the present invention the operating levers or handles are provided at their pivoted ends with short inwardly extending lateral arms or extensions which are respectively pivoted below or inward of the pivot of the handles to the tail ends of the cutting jaws which are upon opposite sides of the appliance to the respective handles, the right-hand lever being connected to the left-hand jaw, and vice-versa, and the arrangement being such that when the levers or handles are closed together the tail ends of the jaws move outward so as to close the cutting edges together.

Figure 1 of the accompanying drawings represents an elevational view of a wire-cutter constructed in accordance with this invention, showing the cutting jaws closed together.

Fig. 2 is a sectional elevation upon an enlarged scale, with the ends of the operating arms represented partly by dotted lines, the jaws being shown in their open position.

Fig. 3 shows a section with the jaws closed, the outer plate of the casing being removed.

Fig. 4 is a cross-section through $x$, Fig. 3.

Fig. 5 shows a section through $x^1$, Fig. 2.

The same reference numerals indicate corresponding parts in each of the figures.

The improved wire cutter is provided with a pair of operating levers or handles 1 which are pivoted together at one end by means of a bolt or pin 2 passing through short longitudinal slots 3 in a pair of side plates 4, the said plates being riveted together at their outer ends and forming a housing for the cutting blades 5. Each of the operating levers 1 is formed upon one side of its pivoted end at a point slightly toward the outer ends of the said levers, with an integral extension 6 carrying a stud or peg 7 upon its inner face which is arranged to pass through a curved transverse slot 8 in the adjacent plate 4 and engage with a hole in the tail or inner end of one of the cutting blades 5. The latter are pivoted near their outer ends, at 9, between the two plates 4 in such a manner that on their inner or tail ends being moved outward, as shown in Fig. 3, the inner edges of their upper ends, which form the cutting jaws, are caused to come together. In operation, the handles 1 on being brought together will be caused to turn about the bolt or pivot 2 connecting together their inner ends, the said bolt moving within the longitudinal slot 3 in the two plates. The pivot pins 7 upon the side extensions of the inner ends of the operating arms will thereby be caused to move within the curved transverse slots 8 in the plates thus operating the tail ends of the blades 5 to which they are pivoted, so as to move them outward. The outer ends of the blades are thus moved toward each other, so that the cutting edges come together. Owing to the above arrangement great power can be readily imparted to the cutting blades enabling very thick wire to be easily severed.

Having fully described our invention, what we desire to claim and secure by Letters Patent is:

1. A hand-operated, wire-cutting implement, comprising a pair of spaced side plates; a pair of co-acting cutting jaws pivoted intermediate their ends between said plates; and a pair of operating levers mounted at their front ends upon a common pivot and having lateral extensions upon their inner or opposed edges, said lateral extensions being situated rearward of said common pivot of said levers and being each pivoted, at a point rearward of said common pivot, to the tail end of the cutting jaw which is upon the opposite side of the implement to the respective lever.

2. In a wire-cutter, the combination of a pair of spaced side plates formed with a pair of registering longitudinal slots and also with a pair of transverse, arcuate slots located in rear of said longitudinal slots, the transverse slots in said plates extending one to one side and the other to the other side of the respective longitudinal slots therein; a pair of co-acting cutting blades pivoted intermediate their ends between said plates, with their pivots located in front and to opposite sides of said longitudinal slots; and a pair of operating levers mounted at their front ends on a common pivot which projects at opposite ends through said longitudinal slots and is arranged to travel toward the rear end thereof during the closing operation of said levers, the front end of each lever having a lateral extension which projects across the extension on the other lever and is provided with a stud attached to the rear end of the adjacent blade, each stud projecting through the adjacent transverse slot and arranged to travel in the same.

In testimony whereof we have hereunto set our hands in presence of two subscribing witnesses.

GEORGE FREDERICK BULL.
ERNEST WALTER STARKEY.

Witnesses:
HENRY NORTON SKERRETT,
WINNIE A. CUTTS.

Copies of this patent may be obtained for five cents each, by addressing the "Commissioner of Patents, Washington, D. C."